INVENTOR.
William R. Harry
BY
Arthur R. Woolfolk
Attorney

Sept. 15, 1959 W. R. HARRY 2,904,656
CIRCUIT INTERRUPTER
Filed Jan. 30, 1950 10 Sheets-Sheet 3

INVENTOR.
William R. Harry
BY
Auden R. Woolfolk
Attorney

Sept. 15, 1959 W. R. HARRY 2,904,656
CIRCUIT INTERRUPTER
Filed Jan. 30, 1950 10 Sheets-Sheet 4

INVENTOR.
William R. Harry
BY
Andrew R. Woolfolk
Attorney

Sept. 15, 1959　　　W. R. HARRY　　　2,904,656
CIRCUIT INTERRUPTER
Filed Jan. 30, 1950　　　　　　　　　　　10 Sheets-Sheet 5
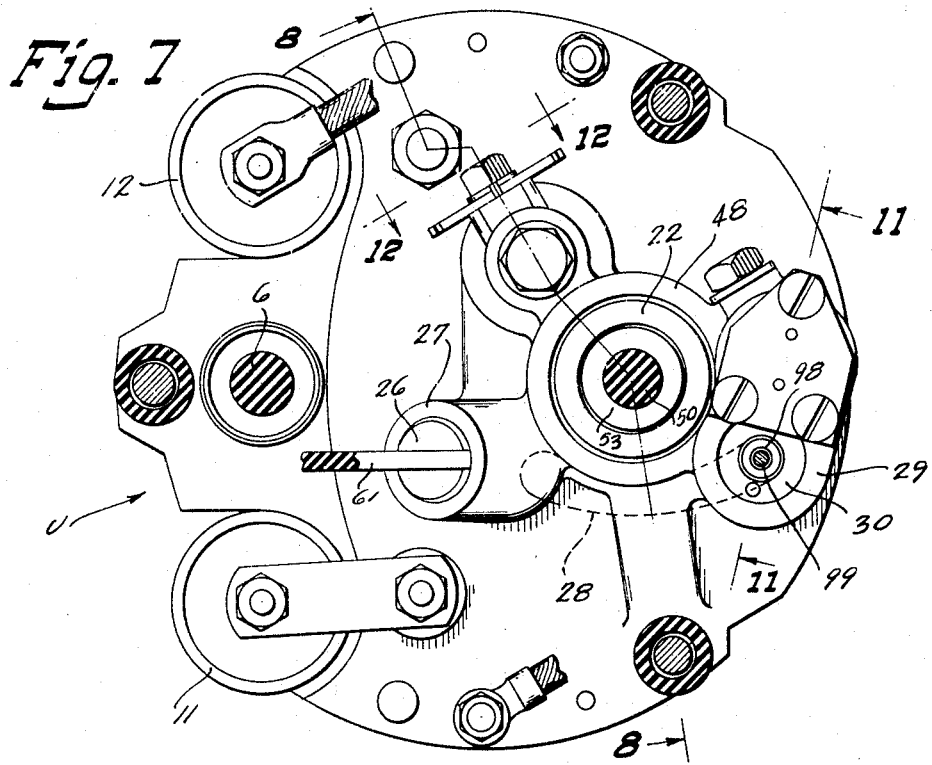
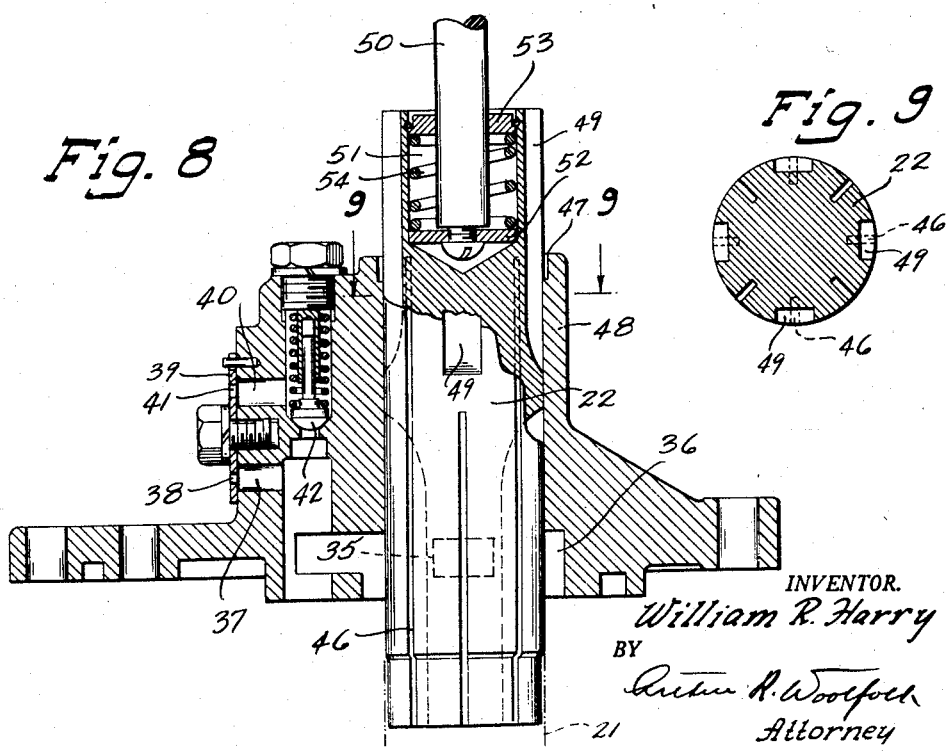
INVENTOR.
William R. Harry
BY
Arthur R. Woolfolk
Attorney

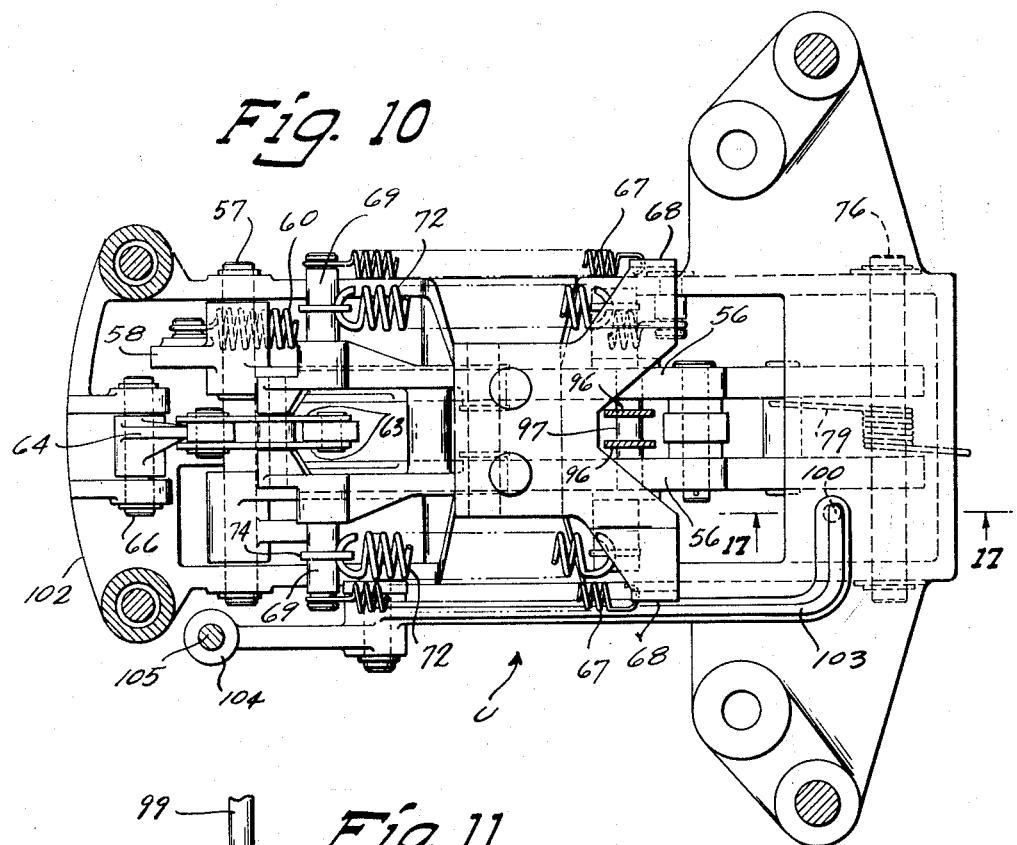
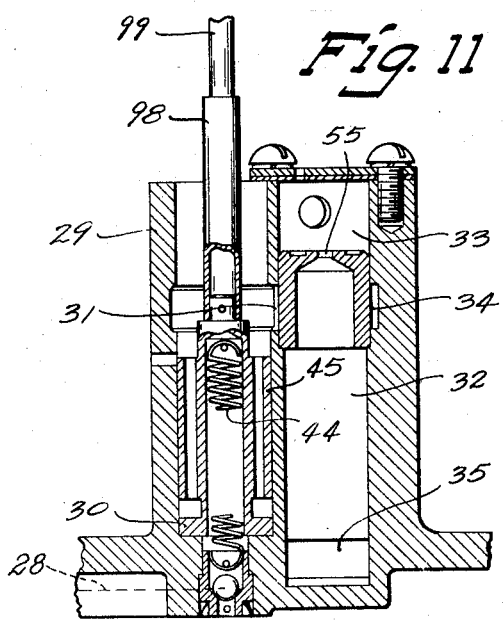
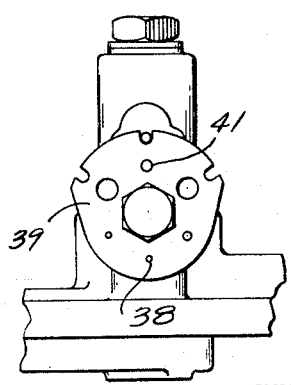

INVENTOR.
William R. Harry
BY
Arthur R. Woolfolk
Attorney

Sept. 15, 1959    W. R. HARRY    2,904,656
CIRCUIT INTERRUPTER
Filed Jan. 30, 1950    10 Sheets-Sheet 8
Fig. 15
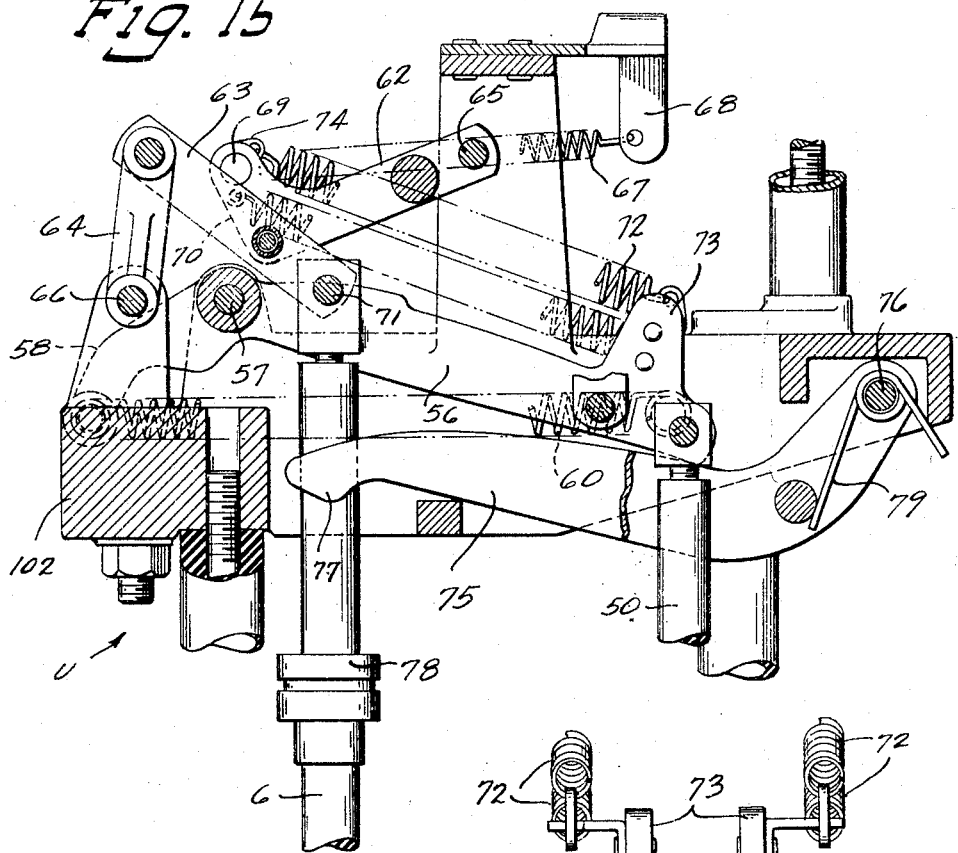
Fig. 16
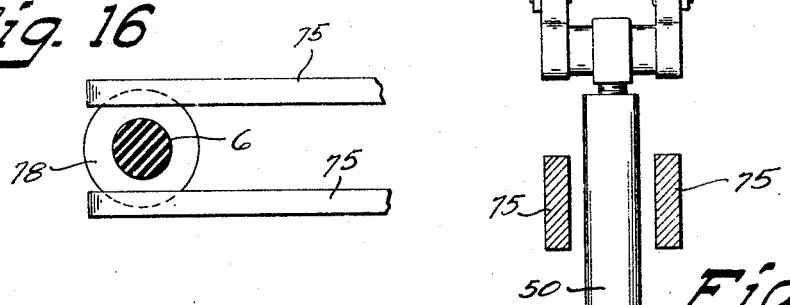
Fig. 18
Fig. 17
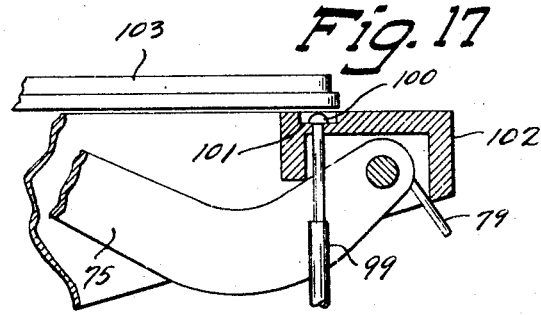
INVENTOR.
William R. Harry
BY
Arthur R. Woolfolk
Attorney Sept. 15, 1959 W. R. HARRY 2,904,656
CIRCUIT INTERRUPTER
Filed Jan. 30, 1950 10 Sheets-Sheet 9
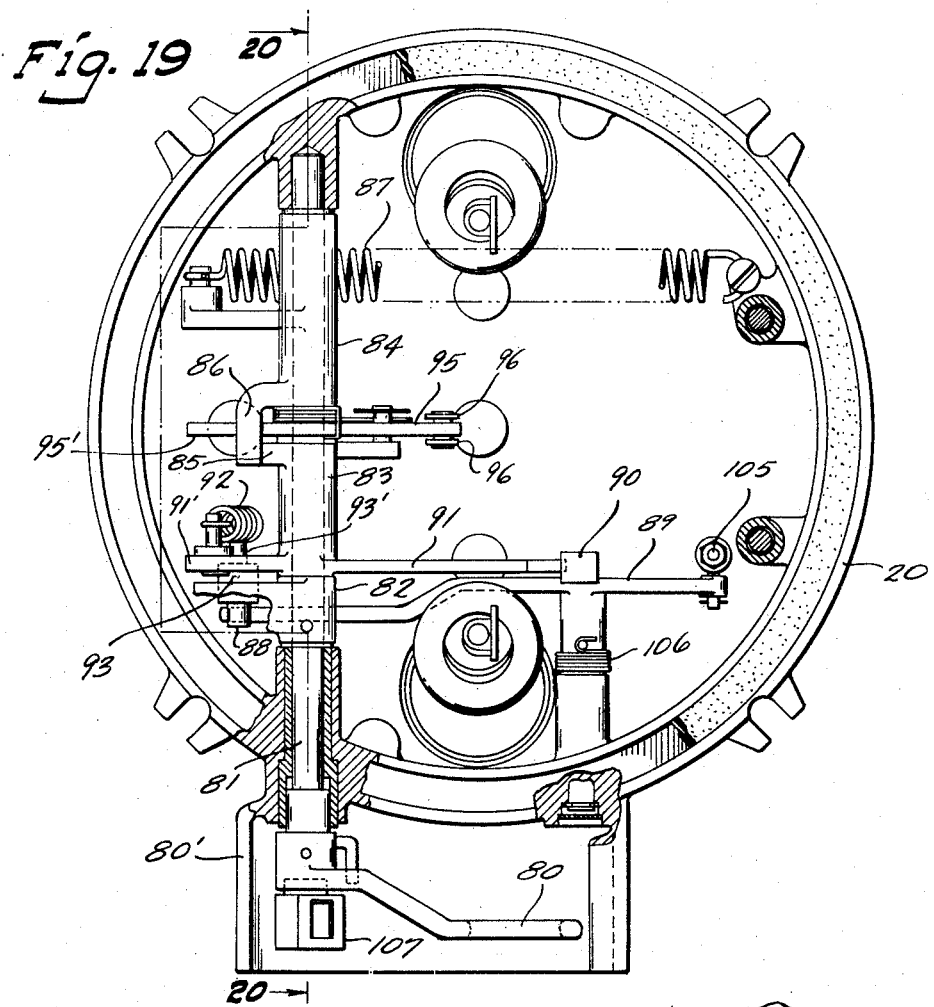
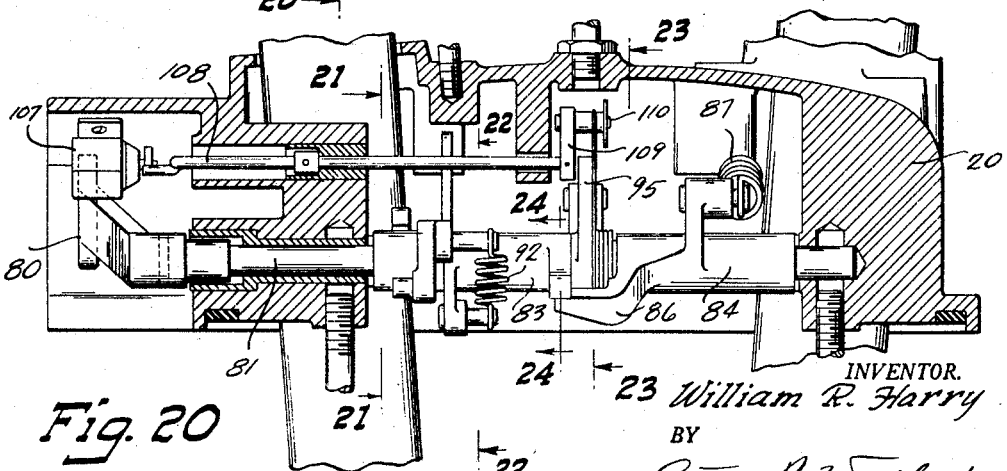
INVENTOR.
William R. Harry
BY
Arthur R. Woolfolk
Attorney Sept. 15, 1959     W. R. HARRY     2,904,656
CIRCUIT INTERRUPTER
Filed Jan. 30, 1950     10 Sheets-Sheet 10
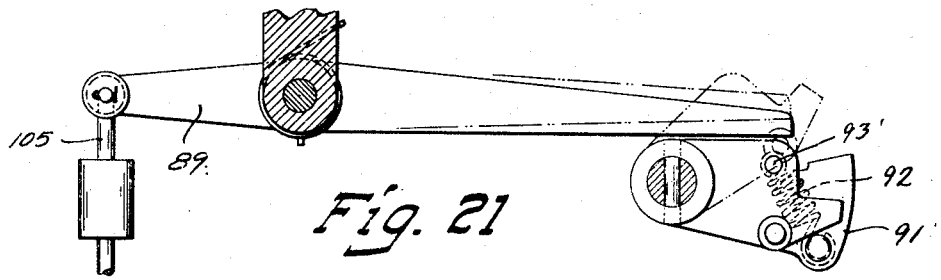
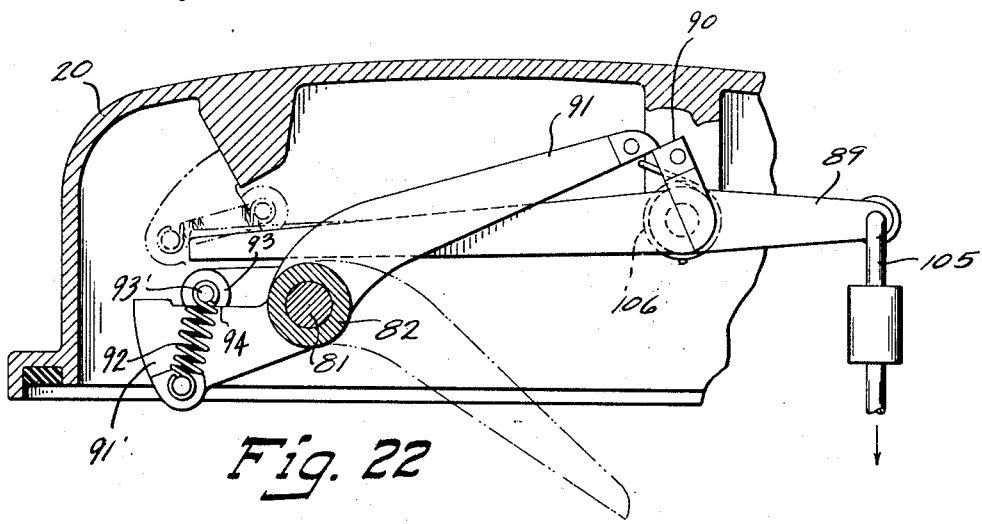
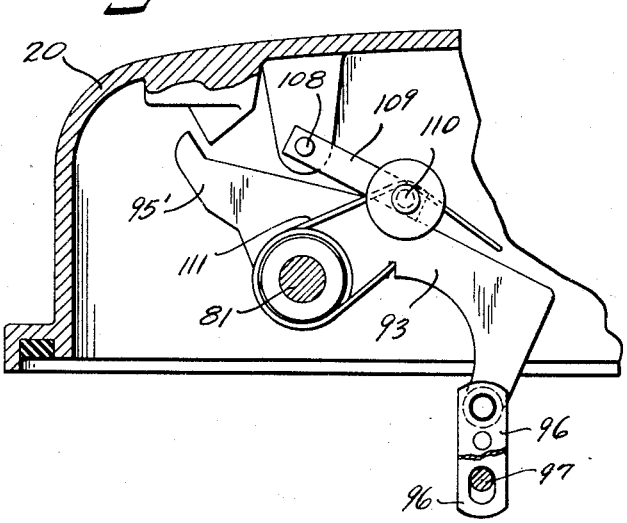
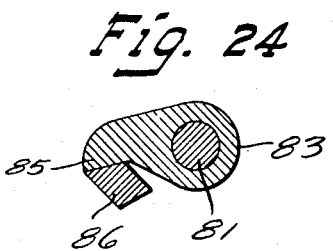
INVENTOR.
William R. Harry
BY
Arthur R. Woodford
Attorney

United States Patent Office 2,904,656
Patented Sept. 15, 1959

2,904,656
CIRCUIT INTERRUPTER

William R. Harry, Milwaukee, Wis., assignor to McGraw-Edison Company, a corporation of Delaware Application January 30, 1950, Serial No. 141,336

5 Claims. (Cl. 200—89)

This invention relates to repeating circuit interrupters.

Objects of this invention are to provide a novel circuit interrupter which is designed for use on primary lines and is capable of handling very large fault currents and which is so made that the mechanical shock, when opening under very heavy overloads, is not allowed to damage any portion of the device.

It has been found that the lever or mechanical system in a circuit interrupter is often unable to stand the extremely heavy shocks imparted thereto due to the transmission of the large amount of energy from the magnetically operated part to the lever or mechanical system under very heavy overloads and this invention is designed to provide a construction whereby the shock is cushioned and is not directly transmitted in a harmful manner, but in which the energy is both partially absorbed and partially temporarily stored and is not transmitted at a harmful rate from the magnetic plunger or member to other portions of the circuit interrupter.

Further objects are to provide a circuit interrupter in which a large amount of kinetic energy is stored in the contact rod and moving contacts and in addition, in which such contacts are caused to open with a quick motion and to close with a quick motion, thus providing a quick break and a quick make, and yet in which the energy transmitted to the contact rod and moving contacts is transmitted in such a manner that the effective lever arm or mechanical connection between the magnetic plunger and the contact rod is gradually altered during the opening operation of the circuit interrupter, so as to provide increasing acceleration or increasing speed for the opening motion of the contact rod and movable contacts and to secure not only this increasing speed of operation as the opening motion progresses, but also to have the maximum mechanical advantage at the initiation of the opening motion of the movable contacts and to have this mechanical advantage progressively decreased during the opening motion, and to provide cushioning means for the final portion of the opening stroke of the movable contacts and contact rod.

Further objects are to provide hydraulic timing or control means which is accurate in its operation, and to provide hydraulic counting means actuated by a pump which pump comes into operation during the return stroke of the magnetic plunger and not during the working stroke thereof, so that the pumping stroke of the pump is independent of the value of the overload, thereby securing uniform pumping action under all conditions.

Further objects are to provide a repeating circuit interrupter which ultimately locks out after a predetermined number of operations, which has one or more fast operations followed by one or more relatively slow or delayed operations on continued overload, and which has a time current curve which can be varied both as to time and to slope of said curve, and to provide a construction in which the time current curve can be so varied or selected by performing a simple adjustment of a minor portion of the circuit interrupter.

In greater detail, further objects are to provide a circuit interrupter in which, on delayed openings, the first part of the stroke of the magnetic plunger is unretarded at the same time that the maximum mechanical advantage of the lever mechanism exists, to thereafter provide a retarded intermediate portion of the stroke of the magnetic plunger, and to provide an unretarded final portion for the stroke of the magnetic plunger and, at substantially the same time, to provide for a quick break of the switch means, such quick break being secured primarily by the high speed of operation of the magnetic plunger and the shifting mechanical advantage provided between the magnetic plunger and the contact rod, and also being augmented by the quick break or quick motion action of spring means.

An embodiment of the invention is shown in the accompanying drawings, in which:

Figure 7 is a sectional view of the lower portion of the circuit interrupter with parts omitted and parts in section corresponding approximately to a section on the line 7—7 of Figure 2.

Figure 8 is a fragmentary sectional view approxmiately on the line 8—8 of Figure 7.

Figure 9 is a sectional view of the magnetic plunger taken on the line 9—9 of Figure 8.

Figure 10 is a view looking down on the circuit interrupter with the cover removed, with parts in section and with parts broken away.

Figure 11 is a sectional view on the line 11—11 of Figure 7.

Figure 12 is a view taken on the line 12—12 of Figure 7.

Figure 15 is a view corresponding to Figure 13 showing the position of the upper portion of the mechanism of the circuit interrupter at the completion of the downward stroke when the circuit interrupter is open.

Figure 16 is a fragmentary view corresponding to a section on the line 16—16 of Figure 14.

Figure 17 is a fragmentary sectional view on the line 17—17 of Figure 10.

Figure 18 is a fragmentary sectional view on the line 18—18 of Figure 14.

Figure 19 is a view looking upwardly into the cover with parts broken away and parts in section.

Figure 20 is a sectional view on the line 20—20 of Figure 19.

Figures 21, 22, 23, and 24 are fragmentary sectional views taken respectively on the lines 21—21, 22—22, 23—23, and 24—24 of Figure 20.

Figure 3:
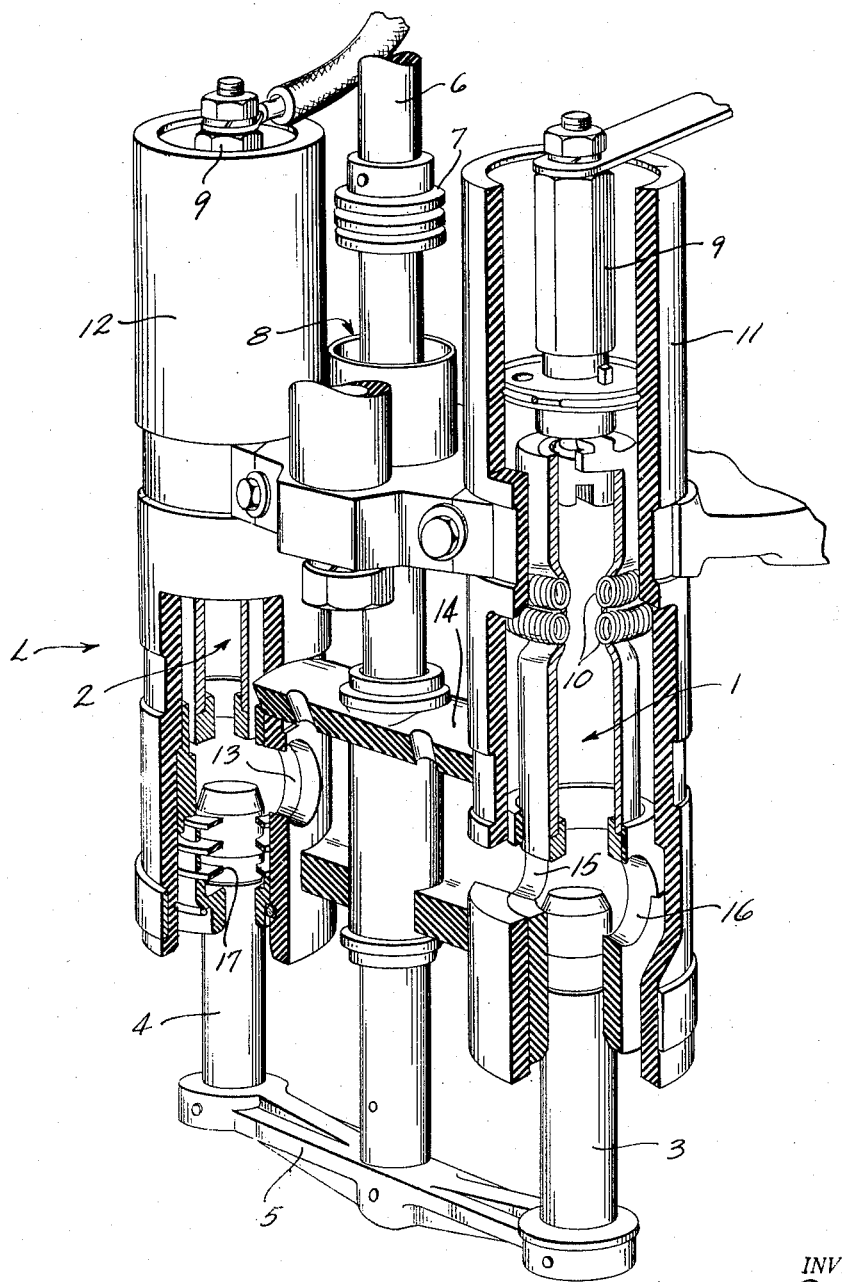
Figure 3 is a perspective view partly broken away of the stationary and movable contacts and associated parts with the movable contacts in an intermediate position.
Figure 4:
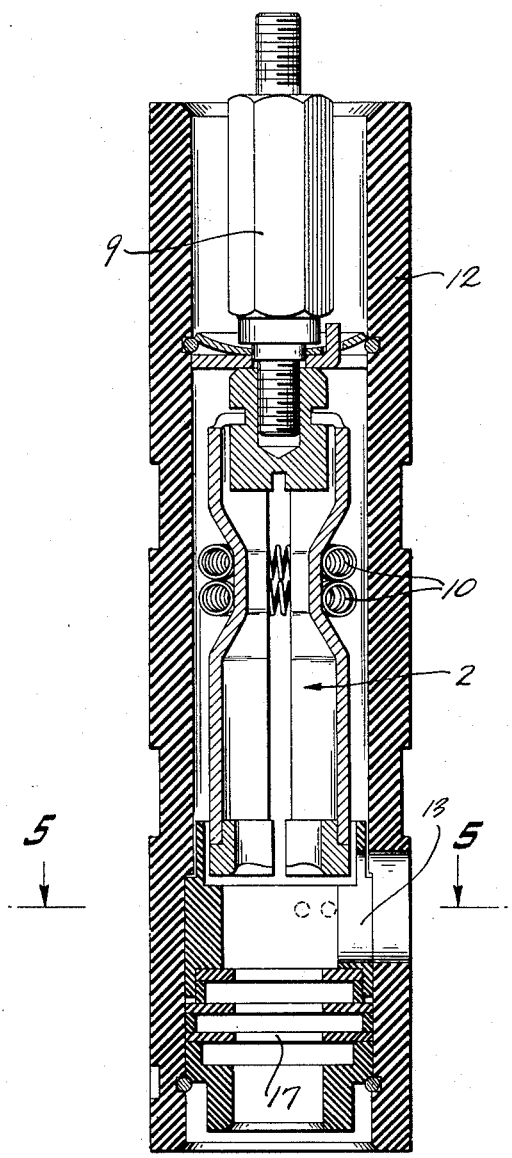
Figure 4 is a sectional view through one of the stationary contacts.
Figure 5:
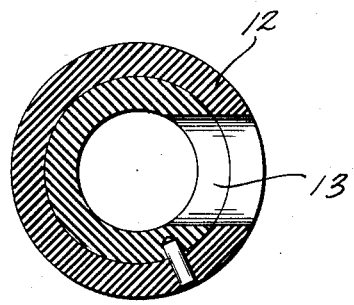
Figure 5 is a sectional view on the line 5—5 of Figure 4.
Figure 6:
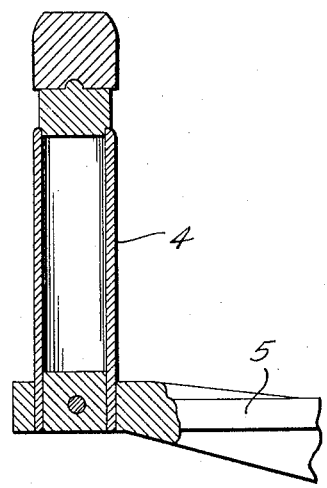
Figure 6 is a sectional view partly broken away of one of the movable contacts.

Referring to the drawings, particularly Figure 3, it will be seen that the circuit interrupter comprises stationary contacts indicated generally by the reference characters 1 and 2 and movable contacts indicated generally by the reference characters 3 and 4 cooperating therewith. It is to be noted further that the movable contacts 3 and 4 are connected by means of a conducting metallic crosshead 5 which constitutes a portion of the movable contact structure. This crosshead is operated by means of a vertically reciprocable insulating rod 6 which may, if desired, be of tubular construction. The insulating rod 6 or contact rod carries a dashpot piston 7 which, in the extreme or lowermost position of the movable contacts, enters the dashpot cylinder 8 and assures the absorption of any remaining kinetic energy stored in the moving contact structure and its immediately associated parts.

The stationary contacts 1 and 2 are formed of a plurality of individual fingers which are pivotally supported from upper conducting members 9, 9 and which are urged towards a contracted or gripping position by means of annular helical springs 10. The stationary contacts 1 and 2 are respectively housed in the tubular insulating cylindrical members 11 and 12. It is to be noted that the tubular insulating member or housing 12 of the stationary contact 2 is provided with an opening 13 which communicates by means of a transverse insulating tubular member 14 with an opening 15 formed in the insulating cylinder 11. Opposite the opening 15, a discharge opening 16 is provided in the insulating cylinder 11. Further it is to be noted that the insulating tubular cylinder 12 carries a plurality of annular baffles 17 through which the movable contact 4 slides during the initial portion of its opening stroke. It is to be understood that Figure 3 shows the circuit interrupter only partially opened and that when it is completely opened, the movable contacts 3 and 4 pass below the insulating cylinders 11 and 12.

Figure 1:
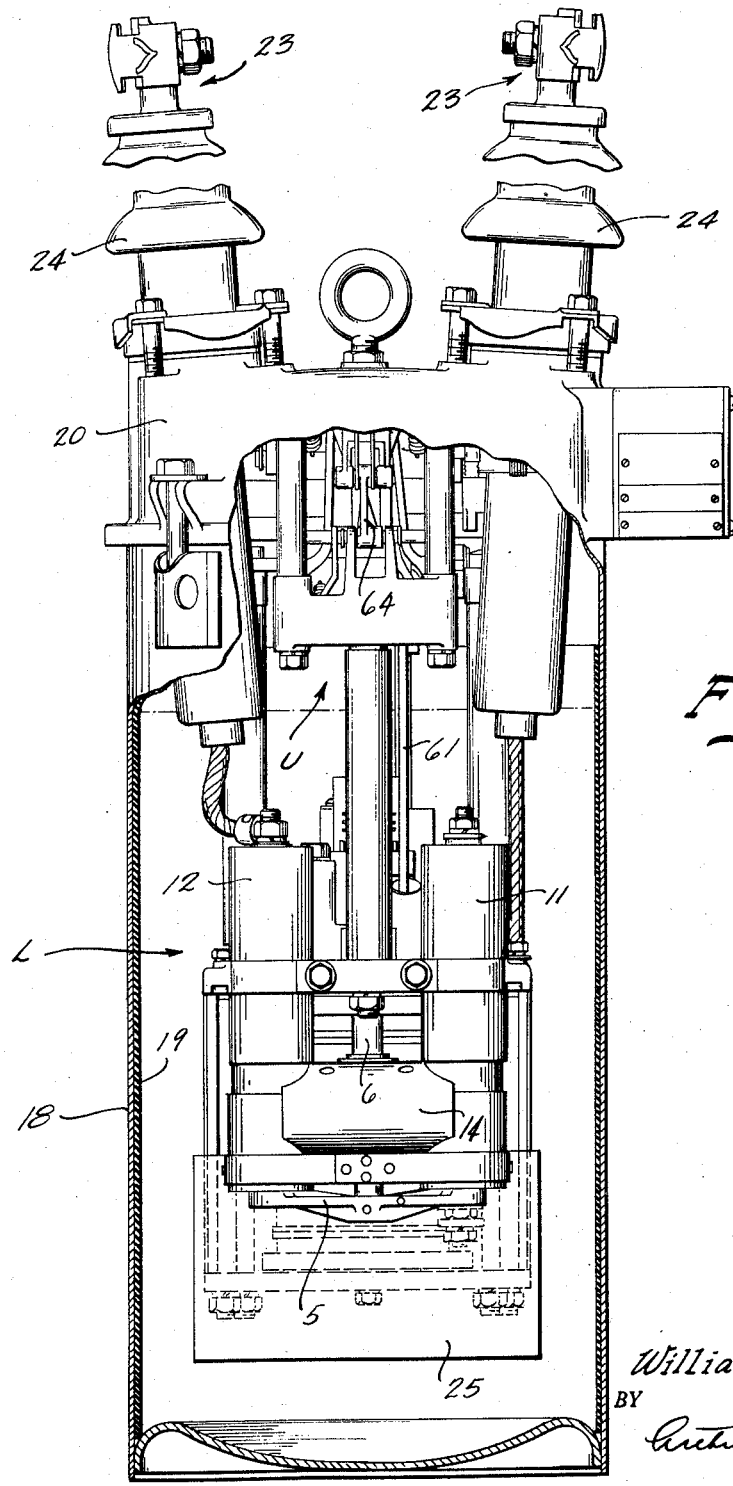
Figure 1 is a side elevation of the circuit interrupter with parts broken away and parts in section.
Figure 2:
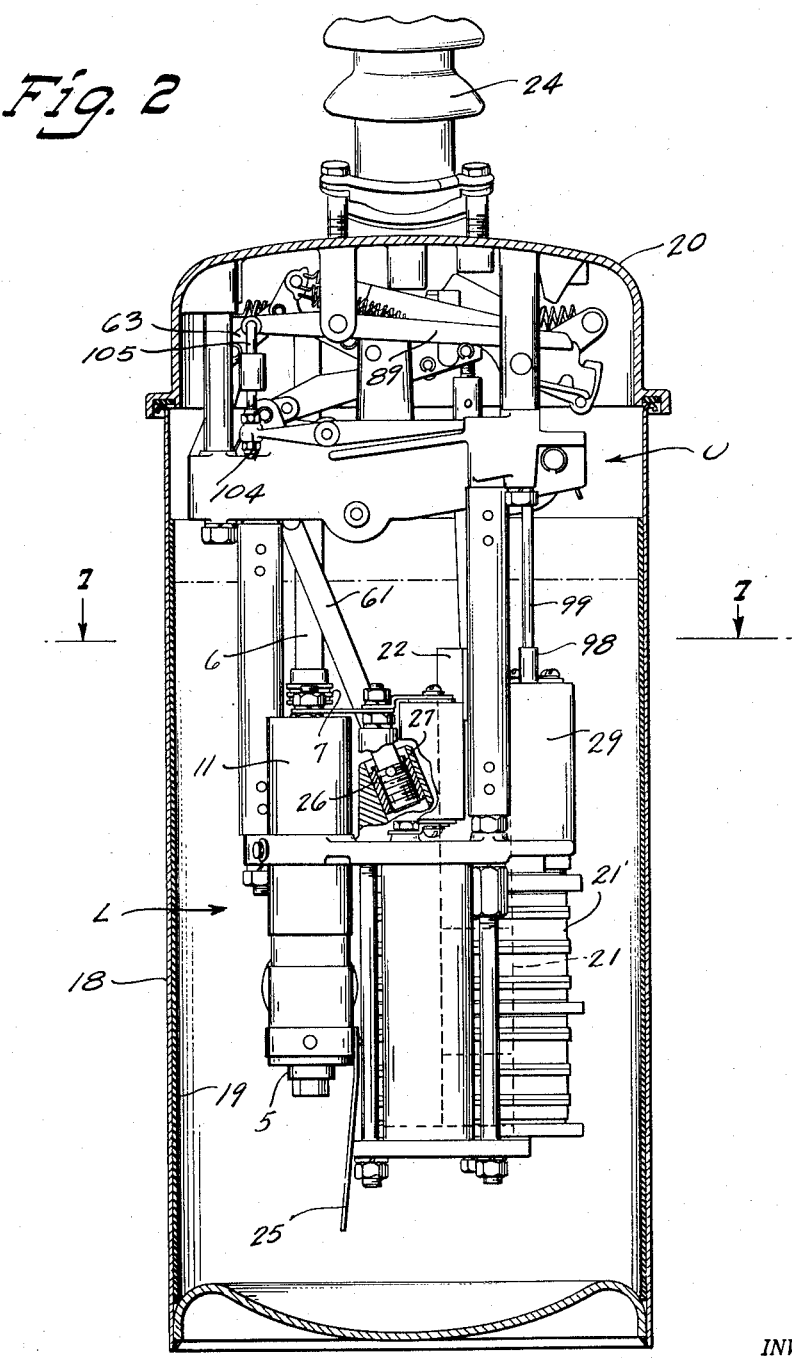
Figure 2 is a side elevation of the circuit interrupter taken at right angles to that shown in Figure 1, with parts broken away and parts in section.

The circuit interrupter is oil immersed and is carried within a tank 18 which may be lined with insulation as indicated at 19 and which is provided with a cover or top 20 from which the working parts of the circuit interrupter are suspended, the cover 20 being removably held to the body portion 18 of the tank in any suitable manner, see Figures 1 and 2.

From the description thus far given, it will be seen that during the initial portion of the opening of the circuit interrupter, gases generated within the lower portion of the insulating cylinder 12, project a blast of oil transversely through the tube 14 and between the movable and stationary contacts 3 and 1, and thus serve to assist in extinguishing the arc.

The circuit interrupter is actuated by means of a solenoid or energizing coil 21', see Figure 2, which serves to draw a magnetic plunger 22, see Figure 8, downwardly when an overload occurs. The solenoid or energizing coil 21' and the switch structure, which includes the movable and stationary contacts, are connected in series between the external terminals indicated generally at 23, see Figure 1. The terminals 23 are suitably supported by insulating bushings 24 which extend downwardly through the cover 20 of the housing of the tank in the usual manner and project downwardly below the oil level.

It is to be noted from reference to Figures 1 and 2, that the lower assembly indicated generally by the reference character L includes the movable and stationary contacts and the solenoid and that this lower assembly is detachably attached to an upper stationary assembly indicated generally by the reference character U which latter is directly suspended from the cover 20, so that all of the working parts of the circuit interrupter are supported or suspended from the cover 20. The upper assembly U carries the operating levers and springs hereinafter described.

It is to be noted from reference to Figures 1 and 2 that an insulating baffle or plate 25 of fiber is positioned between the contact assembly and the solenoid or energizing coil 21 as an added safety feature.

The lower assembly L also carries a pumping piston 26, see Figures 2 and 7, which piston operates in a cylinder 27, suitable valves not shown being provided. The cylinder 27 of the pump communicates by means of a passageway, indicated at 28 in Figure 7, with the lower portion of the cylinder 29 of a counting piston 30. The counting piston is shown in greater detail in Figure 11, and it will be seen from such figure that the cylinder 29 of such counting piston is provided with a passage 31 through its wall which communicates with the passage 32 as shown in Figure 11. The passage 32 may be considered the lower portion of a cylinder 33 within which a slide valve 34 operates. Further it is to be understood that the passage 32 communicates as indicated at 35 with the upper recessed portion 36, see Figure 8, of the cylinder surrounding the magnetic plunger 22. It is to be noted from reference to Figure 8 that the recessed portion 36 of the cylinder 21 of the magnetic plunger 22 is in communication with a passage 37 which is provided with a selected discharge opening 38 in an adjustable apertured plate 39, see Figures 8 and 12. This plate 39 constitutes a selector plate whose adjustment determines the time current characteristics of the circuit interrupter. Further it is to be noted that a second passage 40 communicates with a selected opening 41 formed in the plate 39 but the passage 40 is normally closed off with respect to the cavity or recessed portion 36 at the upper end of the cylinder 21 by means of a spring loaded poppet valve 42, see Figure 8.

As described hereinafter the pumping piston 26 makes a working stroke on the return stroke of the circuit interrupter, that is to say on the non-working stroke thereof while the movable contacts are moving towards closed position, and pumps a measured quantity of oil beneath the counting piston 30. This causes the counting piston to rise a predetermined distance and to raise its trip rod, hereinafter described, in a step-by-step manner for each operation of the circuit interrupter. The counting piston 30 tends to slowly settle back into its initial position as shown in Figure 11 due to leakage around such counting piston 30, the downward motion being assisted by gravity and by means of a spring 44, see Figure 11. However, after a predetermined number of strokes of the circuit interrupter occurring in rapid succession, the counting piston 30 raises its sleeve portion 45, which is formed integrally with the piston and constitutes a part thereof, into a position where it closes the opening 31. Consequently, oil displaced by the magnetic plunger 22 cannot pass freely into the passage 32 and be vented through the opening 31. Under these conditions, it is apparent that the oil displaced by the magnetic plunger 22 must be vented through the opening 38, see Figure 8, and thus a delayed opening of the circuit interrupter is obtained after one or more fast operations. Under very heavy overloads, the poppet valve 42, see Figure 8, is raised against the action of its loading spring and the oil is vented through the opening 41, thus providing a steeper time-current curve than would otherwise be had for heavy overloads.

Another feature which is to be noted in connection with the magnetic plunger 22 is that in the delayed strokes thereof, the first portion of the downward stroke or working stroke of the magnetic plunger 22, see Figure 8, is unretarded. This is obtained by means of the elongated slots 46 formed in the magnetic piston 22, see Figure 8, which extend up to the clearance or annular space 47 and consequently allow the free passage of oil therethrough. However, after the magnetic piston 22 has started downwardly, its further downward motion is delayed as the upper end of the slots 42 are now closed by the surrounding cylinder-like portion 48 through which the magnetic piston 22 slides, as shown in Figure 8. Thereafter the major portion of the further downward stroke or working stroke of the magnetic piston or plunger 22 is delayed until the lower end of the relatively large slots 49 formed in such piston pass below the lower portion of the cylindrical part 48 of the surrounding casting, at which time the final portion of the downward stroke of the magnetic plunger 22 will be rapid.

The energy or force from the magnetic plunger 22 is transmitted through the insulating plunger rod 50 to the lever mechanism, hereinafter described, and from there to the movable contacts through the medium of the contact rod 6, see Figure 3.

It is to be noted that a dashpot is formed in the upper end of the magnetic plunger 22. This dashpot consists of the cylindrical cavity 51 formed in the magnetic plunger 22 and a piston 52 carried by the lower end of the plunger rod 50. The plunger rod 50 freely slides through the upper closure member 53 of the cavity 51 and the oil trapped between the piston 50 and the closure member 53 serves as an energy absorbing medium to cushion the shock due to a heavy overload. The oil leaks around the piston 52 and a true dashpot action is, therefore, produced. Also it is to be noted that a spring 54 is, in effect, interposed between the magnetic plunger 22 and the plunger rod 50 and energy is stored in this spring when the plunger rod is drawn downwardly in a violent manner due to a heavy overload and thus the shock incident to heavy overloads is partially absorbed and partially cushioned and other portions of the mechanism are not damaged on heavy overloads. The energy stored in the spring 54 is subsequently transmitted to other portions of the mechanism.

From the description thus far given, it will be seen that the circuit interrupter has one or more quick opening operations and thereafter has one or more delayed opening operations. The closing operation of the circuit interrupter is always delayed a predetermined amount due to the action of the slide valve 34. The slide valve, see Figure 11 is quickly moved upwardly on the downward stroke of the magnetic plunger 22, see Figure 8, but on the return upward stroke of the magnetic plunger 22 corresponding to closing motion of the circuit interrupter, the slide valve 34 is drawn downwardly until it is arrested at its lowest position, as shown in Figure 11. Thereafter, oil entering the cylinder 21, see Figure 2 surrounding the magnetic plunger 22, must pass through the constricted orifice 55, see Figure 11, in the slide valve 34 and thus the closing stroke of the circuit interrupter is delayed a predetermined amount after each opening operation.

It is to be noted that the slide valve 34 is a relatively small, light member and is quickly driven to the upper portion of its stroke, thereby sealing the opening 55 on the downward stroke of the magnetic plunger, so that the opening 55 of the slide valve has no effect on the downward stroke of the magnetic plunger.

The action of the slide valve 34 and the counting piston 30, with its sleeve 45 for producing the two time-current characteristic, is the same as that set forth in the application of Anthony Van Ryan and Carl Schindler, Serial No. 585,238, filed March 28, 1945, now Patent No. 2,560,831 of July 17, 1951 for Circuit Interrupter and assigned to the same assignee as this application.

Attention is now directed to the upper assembly indicated generally by the reference character U in Figures 1 and 2. This upper assembly is shown in greater detail in Figures 10 and 13 through 18.

Figure 13:
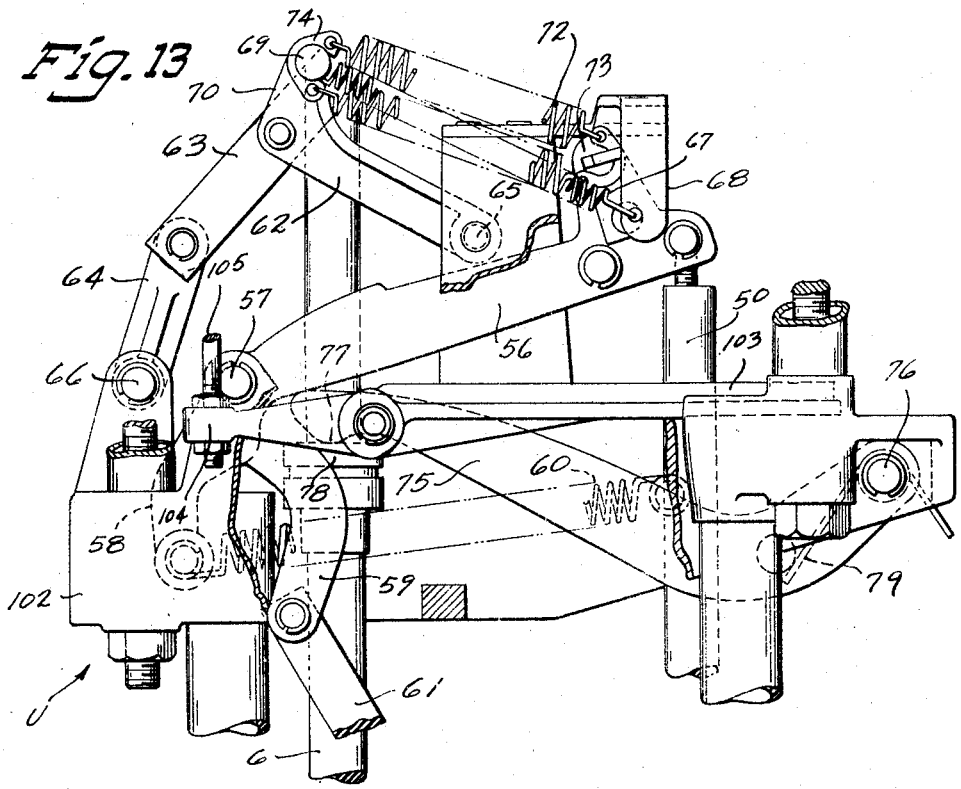
Figure 13 is a view of the upper portion of the circuit interrupter with parts in section and parts broken away, such view showing the mechanism in the uppermost or closed position of the circuit interrupter.
Figure 14:
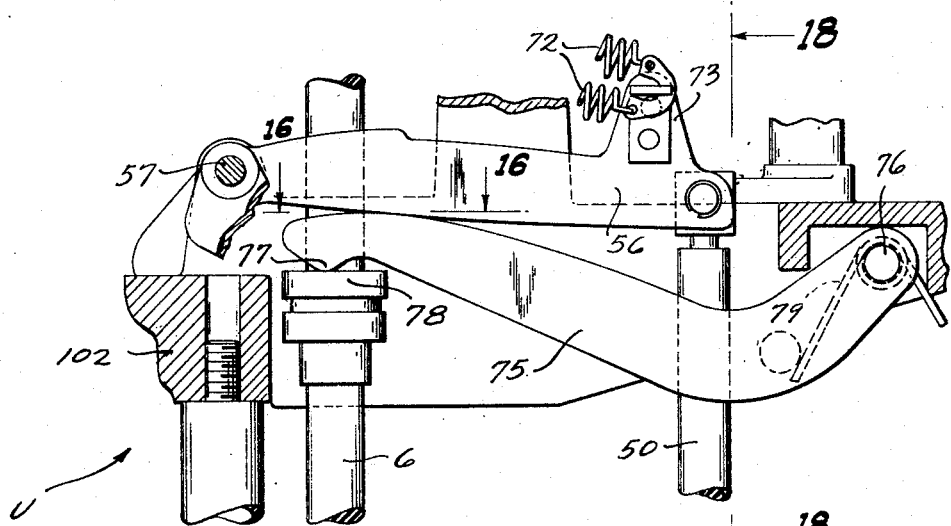
Figure 14 is a view corresponding to Figure 13 showing the upper part of the mechanism of the circuit interrupter just at the beginning of the downward stroke of the levers.

The magnetic plunger rod 50 is connected to one end of the main lever 56, see Figures 13, 14, and 15. This main lever 56 is composed of opposed parts as is obvious from Figure 10, but these parts constitute one rigid member. This main lever 56 is the operating or driving lever for the rest of the mechanism. It is pivotally mounted on the pivot pin 57 and is provided with a pair of spaced lower arms 58 and 59 to which are respectively connected the relatively heavy spring 60 and the connecting rod 61 for the pump. As has been previously explained, the pump operates on the return or non-working stroke of the magnetic plunger, that is to say, when the main lever 56 is rising. The spring 60 substantially balances the weight of the magnetic plunger rod 50 and of the magnetic plunger 22.

The upper end of the contact rod 6 is guided by straight line motion mechanism consisting of the levers 62 and 63 and the link 64. The contact rod is pivoted to the outer end of the lever 63 as shown in Figure 15, and the lever 62 and the link 64 are, respectively, pivoted on fixed pivot pins 65 and 66. It is to be understood that the levers 62 and 63 are in reality formed of two portions but since they constitute, in each instance, a single lever, they will be so described.

A pair of springs 67 have one of their ends secured to fixed brackets 68 and the other of their ends secured to a pin 69 carried by the short upwardly projecting arms 70 of the lever 62, it being noted that the lever 62 is, in reality, a bell crank lever. The pivot pin connecting the contact rod 6 with the lever 63 is indicated at 71 in Figure 15.

The springs 67 are primarily for substantially balancing the weight of the contact rod 6 and the movable contacts and connecting crosshead 3, 4, and 5, respectively.

It is to be noted, however, that the effect of the springs 67 decreases to approximately zero at the time that the movable contacts are in their fully open position.

A plurality of springs arranged in pairs and indicated by the reference character 72 are connected to upwardly projecting lugs 73 formed on the main lever 56 and to yokes 74 carried by the pins 69 of the lever 62, as shown in Figures 13 and 15. The springs 72 constitute quick motion springs in association with the lever 62, for it will be seen that when the parts move from switch closed position corresponding to the uppermost position of the parts, as shown in Figure 13, to switch open position corresponding to the lowermost position of the parts as shown in Figure 15, that the springs 72 cross the pivot point 65 of the lever 62. However, the main opening force imparted to the contact rod 6 is through the direct transfer of energy from the main lever 56 of the magnetic plunger to the contact rod lever 75 hereinbelow described in detail.

The contact rod lever or contact lever 75 is, in reality, formed of two sections which are pivotally mounted on the fixed pivot pin 76. The outer end of the contact lever 75 is provided with downwardly projecting rounded feet or portions 77 which straddle the contact rod 6 and are arranged to engage the upper surface of a collar 78 carried by the contact rod 6. The collar 78 may be a composite collar with a loose upper portion, a yielding intermediate portion and with the lower portion rigidly attached to the contact rod 6. The feet 77 of the contact lever may initially be spaced above the collar 78 or may be in contact therewith. A spring 79 is provided for urging the contact lever 75 upwardly and serves to return such contact lever or contact operating lever 75 when the main lever or magnetic plunger operated lever 56 moves to its uppermost position as shown in Figure 13.

Attention is particularly directed to Figures 13, 14, and 15 which show the sequence in the switch opening action of the parts. It is to be noted that the upper surface of the contact operating lever 75 is curved and rides or bears directly against the straight under side of the main or magnetic plunger lever 56. The purpose of this is to provide the maximum mechanical advantage between the levers 56 and 75 at the start of the opening stroke of the magnetic plunger. Another reason for this structure is to insure the fastest possible contact velocity under high overloads and also under low overloads. Heretofore, if the highest possible contact velocity for high overloads was secured, the contact velocity for low overloads fell off to a point of being deleterious. A further advantage of this structure is evident when it is considered that the contact rod 6 does not move downwardly until the rod 50 moves the lever 56 approximately past the horizontal position. This precludes a phenomena known as "telegraphing" or "triggering." Further, an advantage of this structure is seen when it is considered that after the second shot of the recloser, the rod 50 may be moved downwardly under the influence of the electromagnetic coil and simultaneously the fuse with which the breaker may be coordinated blows, it is apparent then that the contacts of the breaker will not be open. The accelerated movement of the contacts is produced when the rod 50 pulls the lever 56 past the horizontal position and the plunger is in its unretarded movement as described hereinabove. It is apparent from an examination of Figure 13 that the point of contact between the lever 75 and the lever 56 is adjacent the outer end of the lever 75, and close to the pivot point 57 of the lever 56. Thus it is apparent that the maximum force is exerted on the lever 75 at the start of the opening stroke. This force decreases as the mechanical advantage decreases as is obvious by comparing Figures 14 and 15 with Figure 13, as the point of contact of the switch lever or contact operating lever 75 and the main lever or magnetic plunger operated lever 56 travels to the right as viewed in Figures 13, 14, and 15. As the opening or downward motion of the parts progresses, it is apparent from an examination of Figure 15 in comparison with Figure 14, that the point of contact between the switch operating lever 75 and the magnetic plunger lever 56 has moved to a point closely adjacent the pivot point 76 of the switch operating lever 75 and has at the same time moved outwardly to substantially the free end of the main or magnetic plunger lever 56, thus greatly decreasing the mechanical advantage and markedly increasing the relative speed of downward travel of the contacts or contact operating rod 6.

The downward speed of the contact rod 6 is thus accelerated as the downward motion of the parts progresses due to the action hereinabove set forth in detail. This increase in speed of the rod 6 is through the action of the mechanical means independently of any change in speed of the magnetic plunger. The action of the springs 72 tend to produce a snap action or quick break for the switch means when the springs 72 pass the pivot point 65 of the lever 62. Similarly, on upward motion of the contact rod 6, the springs 72 again cross dead center 65 of the lever 62 and produce a quick make or closing of the switch parts. It will be noted that the rod 50 on the upward stroke at the end of its travel moves very rapidly due to the cooperation of the slots 46 with the passages in the cylinder. As stated, the slots enable the rod 50 at the end of its upward movement to move quite rapidly so as to enable the snap acting device to move the rod 6 very rapidly so as to perform a quick make.

The reason for the unretarded movement of the plunger 50 at the end of its travel is as follows: Due to manufacturing discrepancies, that is variances intolerances and friction, there is an undetermined point where the rod 6 is triggered. Therefore, if at the end of its movement the rod 50 is unretarded, the time error caused by the manufacturing discrepancies and variance in tolerance and friction is reduced to the optimum. This enables consistent performance of many breakers as to reclosing time.

As previously described, even when there is a delayed action for the opening of the circuit interrupter, the magnetic plunger is delayed only during an intermediate portion of its stroke and executes the first and last portions of its stroke without retardation. This action of the magnetic plunger also contributes to the quick break of the switch mechanism.

Under very heavy overloads, there is a very great force developed by the magnetic plunger 22. This would ordinarily produce an extremely severe shock which would be difficult to carry by the remaining parts of the mechanism if it were directly transmitted thereto. However, from reference to Figure 8 it will be seen that the dashpot action secured by the dashpot piston 52 in the cylinder 51 at the upper end of the magnetic plunger 22 absorbs a considerable amount of this energy and also the spring 54 stores a good part of the energy. The energy stored in the spring 54 is transmitted in a gradual manner to the mechanism of the circuit interrupter and this coupled with the cushioning action of the dashpot at the upper end of the magnetic plunger hereinabove discussed prevents excessive strains being imposed on the mechanism.

The cap or head portion 20 of the circuit interrupter carries the manual trip and reset means as well as a part of the automatic trip means and the lock-out means for locking the circuit interrupter in open position.

The manual trip and reset means is controlled by means of an eyeleted handle 80 normally housed within a small housing 80' integral with the cover or head portion 20. This housing is open at its lower part and normally the handle 80 is protected by the housing from sleet and the elements. However, it may be pulled downwardly by hand or by means of a switch stick or it may move downwardly automatically when the circuit interrupter is automatically locked out to thereby give a visual signal.

The handle 80 is rigidly secured to a shaft 81 extending transversely across the head 20 as shown in Figures 19 and 20. The shaft 20 rigidly carries a hub 82 and loosely carries a pair of hubs 83 and 84. The hubs 83 and 84 could, except for ease in assembly, be made integral. They are interconnected by means of the fingers 85 and 86, see Figures 19 and 24, the hub 84 being constantly urged towards rotation by means of the heavy lock-out spring 87. This, therefore, holds the fingers 85 and 86 in permanent contact with each other.

The hub 82 is provided with a cam or pin 88 which is adapted to rock a latch lever 89 and free the latch 90, rigid with the latch lever 89, from restraining engagement with the latch arm 91, see Figures 19 and 22. Further, it is to be noted that the latch arm 91 is connected by means of a spring 92 with a pin 93' supported from the hub 82. The hub 82 is provided with a projecting portion 93 which has a flat face 94 arranged to engage the rearwardly projecting portion 91' of the latch arm 91. The spring 92 merely holds the member 93 normally in contact with the rearwardly projecting portion 91' of the latch arm 91.

When the handle 80 is pulled downwardly, see Figure 20, the spring 92 is extended and the cam or pin 88 rocks the latch lever 89 and moves the latch 90 out of engagement with the latch arm 91 and thus releases such latch arm. This allows the hub 84 to be rocked by means of the heavy lock-out spring 87 and consequently causes the arm 86 to engage the lever 95 carried loosely on the shaft 81. The lever 95 is connected by means of links 96 to the magentic plunger lever 56 by means of a pin 97, see Figures 10 and 23, and is provided with a rearwardly extending portion 95' which is positioned beneath the finger or arm 86 of the hub 84. It is apparent, therefore, that when the latch lever 91 is released and the hub 84 with its arm 86 rotates under the influence of the lock-out spring 87, that the lever 95 will be rocked downwardly and will thereby force the magnetic plunger downwardly and thus open the switch. The switch remains open until the parts are reset by moving the handle 80 upwardly. When the handle 80 is moved upwardly, the projection 93, see Figures 19 and 22, which is carried by the hub 82 engages the rearwardly extension 91' of the latch arm 91, see Figure 22, and consequently rocks the latch arm back to its full line locked position shown in Figure 22.

The lock-out means is also arranged to be tripped by means of the counting piston when the counting piston has arrived at a predetermined point due to a plurality of operations of the circuit interrupter occurring in rapid succession. The counting piston 30 is provided with an upwardly projecting sleeve 98 which loosely receives a projecting pin 99, see Figures 2, 7 and 11. The pin 99 terminates in a head 100, see Figure 17, which is enlarged and rests within a recess 101 formed in the main stationary or body portion 102 of the upper assembly U. The head 100 of the pin 99 is adapted to engage one end of a rock lever 103 whose other end is indicated by the reference character 104, see Figure 10. The end 104 of the rock lever, see Figure 2, is connected by means of a weighted link 105 with the latch lever 89 which is biased in a counterclockwise direction as viewed in Figure 22 by means of the spring 106. The latch lever is tripped by means of the weighted link 105 through the medium of the counting piston and the mechanism hereinabove described, after a predetermined number of closely successive circuit interrupting operations have occurred.

It is preferable to allow lost motion between the sleeve or portion 98 of the counting piston and the stem 99, see Figures 2 and 11. This lost motion may be provided in any suitable manner, not shown, for instance by suitably recessing the portion 98.

If desired, counting means may be provided as indicated by the reference character 107. This counting means is actuated in any suitable manner as by means of the rock shaft 108, see Figure 20. The rock shaft 108 extends inwardly into the head portion 20 of the circuit interrupter and is provided with an arm 109 which is operated from the lever 95 through the medium of a crank pin 110 carried by the arm 109, see Figure 23. A spring 111 holds the arm 110 in contact with the upper side of the lever 95. This counting mechanism merely records the number of operations performed by the circuit interrupter.

It will be seen that a novel form of circuit interrupter has been provided which will handle very heavy overloads without dangerous shock to the mechanism and which is so constructed that the switch means has a quick make and a quick break. Further it will be seen that the circuit interrupter has a steep time-current characteristic for relatively small overloads and a much steeper time-current characteristic for relatively heavy overloads than could otherwise be provided by any of the customary constructions.

Further, it will be seen that the mechanism mechanically connecting the magnetically operated plunger and the switch means is so constructed that the mechanical advantage varies throughout the opening stroke of the parts, so that the contact rod is brought up to high speed primarily through the action of this mechanical mechanism and such speed is augmented by means of the snap action spring mechanism. Further it will be seen that the magnetic plunger itself, on delayed operation of the circuit interrupter, has a quick stroke at the final portion of its stroke and at the initiation of its stroke with the delay occurring at an intermediate portion of its stroke.

It is to be noted also that the different time-current characteristic can be obtained properly by adjusting the apertured selector disk or plate 39, see Figure 12, in the manner hereinabove described. In addition to these features, the pump, it will be noted, executes its pumping stroke during the return or non-working stroke of the magnetic plunger and is consequently operated at substantially the same rate under all conditions, irrespective of the value of the overload which causes the opening of the circuit interrupter prior to the working stroke of the pump.

It is to be noted that the lever mechanism operatively interposed between the magnetic plunger and the contact rod is a means for securing an automatic variable speed and force ratio between the magnetic plunger and the switch means. At the beginning of the opening operation of the circuit interrupter the maximum mechanical advantage is obtained and consequently the maximum leverage is secured between the magnetic plunger or armature and the contact rod. This is accompanied by a minimum speed ratio but as the opening motion progresses the mechanical advantage decreases and the speed ratio increases, so far as this variable speed or variable force mechanism is concerned.

Although this invention has been described in considerable detail, it is to be understood that such description is intended as illustrative rather than limiting, as the invention may be variously embodied and is to be interpreted as claimed.

I claim:

1. A circuit interrupter comprising overload responsive means including a coil and a magnetic plunger operated thereby, switch means, a lever operatively connected to said magnetic plunger, a switch lever operatively connected to said switch means, said lever having an automatically shifting point of contact as said circuit interrupter executes an opening operation due to the relative motion of said levers during the operation of said circuit interrupter with the mechanical advantage a maximum at the beginning of the opening operation and shifting towards a minimum as the opening operation progresses, said switch lever being free of operative connection with said switch means on return motion of said plunger, and operating means effective to close said switch means independently of said switch lever.

2. A circuit interrupter comprising overload responsive means including a coil and a magnetic plunger operated thereby, switch means, mechanism operatively interposed between said plunger and switch means for opening said switch means on operation of said plunger in response to overload, and a dashpot formed in the magnetic plunger and interposed between said plunger and said mechanism for cushioning shocks from severe overloads before such shocks can be transmitted to said mechanism.

3. A circuit interrupter comprising overload responsive means including a coil and a magnetic plunger operated thereby, switch means, mechanism operatively interposed between said plunger and switch means for opening said switch means on operation of said plunger in response to overload, and a dashpot formed in the magnetic plunger and energy storing spring means interposed between said plunger and said mechanism for cushioning shocks from severe overloads before such shocks can be transmitted to said mechanism.

4. A circuit interrupter comprising overload responsive means including a coil and a magnetic plunger operated thereby, switch means, mechanism operatively interposed between said plunger and switch means for opening said switch means on operation of said plunger in response to overload, and a dashpot and energy storing spring means carried directly by said plunger and movable therewith as a unit and operatively interposed between said plunger and said mechanism.

5. A circuit interrupter comprising overload responsive means including a coil and a magnetic plunger operated thereby, switch means, a lever operatively connected to said magnetic plunger, a switch lever operatively connected to said switch means, said levers having an automatically shifting point of contact as said circuit interrupter executes an opening operation due to the relative motion of said levers during the operation of said circuit interrupter with the mechanical advantage a maximum at the beginning of the opening operation and shifting towards a minimum as the opening operation progresses, and time delay means operatively connected to said magnetic plunger independently of said switch means, said time delay means having relief means which opens during the last portion of the working stroke of said magnetic plunger.

References Cited in the file of this patent

UNITED STATES PATENTS

| | | |
|---|---|---|
| 656,282 | Brubaker et al. | Aug. 21, 1900 |
| 690,445 | Leadbeater | Jan. 7, 1902 |
| 830,209 | Conkling et al. | Sept. 4, 1906 |
| 868,348 | Kramer | Oct. 15, 1907 |
| 1,182,900 | Everett | May 16, 1916 |
| 1,289,649 | De Camp | Dec. 31, 1918 |
| 1,295,065 | Riley et al. | Feb. 18, 1919 |
| 1,376,462 | Robertshaw | May 3, 1921 |
| 1,487,439 | Burnham | Mar. 18, 1924 |
| 1,516,908 | Baluta et al. | Nov. 25, 1924 |
| 1,517,042 | Anderson | Nov. 25, 1924 |
| 1,713,460 | Wood | May 14, 1929 |
| 1,764,415 | Riley | June 17, 1930 |
| 1,940,980 | Svenson | Dec. 26, 1933 |
| 2,029,137 | Stevens | Jan. 28, 1936 |
| 2,295,691 | Russell | Sept. 15, 1942 |
| 2,333,604 | Wallace | Nov. 2, 1943 |
| 2,414,956 | Kyle et al. | Jan. 28, 1947 |
| 2,442,477 | Wallace et al. | June 1, 1948 |
| 2,477,067 | Kyle et al. | July 26, 1949 |
| 2,622,167 | Rawlins et al. | Dec. 16, 1952 |
| 2,626,329 | Wallace et al. | Jan. 20, 1953 |